(12) United States Patent
Zhou

(10) Patent No.: US 7,788,707 B1
(45) Date of Patent: Aug. 31, 2010

(54) SELF-ORGANIZED NETWORK SETUP

(75) Inventor: Tong Zhou, Overland Park, KS (US)

(73) Assignee: Sprint Spectrum L.P., Overland Parks, KS (US)

( * ) Notice: Subject to any disclaimer, the term of this patent is extended or adjusted under 35 U.S.C. 154(b) by 1135 days.

(21) Appl. No.: 11/439,472

(22) Filed: May 23, 2006

(51) Int. Cl.
*G06F 7/04* (2006.01)
*G06F 15/16* (2006.01)

(52) U.S. Cl. .................. 726/4; 726/21; 713/168; 709/206; 709/207

(58) Field of Classification Search .............. 726/4; 713/168; 709/206, 207
See application file for complete search history.

(56) References Cited

U.S. PATENT DOCUMENTS

| | | | |
|---|---|---|---|
| 6,920,559 B1 * | 7/2005 | Nessett et al. ............. | 713/168 |
| 6,993,596 B2 * | 1/2006 | Hinton et al. ............. | 709/250 |
| 7,181,614 B1 * | 2/2007 | Gehrmann et al. ......... | 713/155 |
| 7,213,047 B2 * | 5/2007 | Yeager et al. ............. | 709/202 |
| 7,254,608 B2 * | 8/2007 | Yeager et al. ............. | 709/203 |
| 7,480,939 B1 * | 1/2009 | Nessett et al. ............. | 726/22 |
| 7,484,012 B2 * | 1/2009 | Hinton et al. ............. | 709/250 |
| 2003/0046097 A1 | 3/2003 | LaSalle et al. ............. | 705/1 |
| 2004/0088347 A1 | 5/2004 | Yeager et al. ............. | 709/202 |
| 2006/0173963 A1 * | 8/2006 | Roseway et al. .......... | 709/206 |

OTHER PUBLICATIONS

Boyce et al., "Comprehend Windows Server 2003 Trust Relationships and Functional Levels," http://techrepublic.com.com/5100-1035-5169218.html.

* cited by examiner

*Primary Examiner*—Christian LaForgia

(57) ABSTRACT

A second user requests access to a wireless access point, such as a WiFi connection, provided by a first user. To determine whether the first user should be provided with access, the second user identifies a chain of trust relationships between the first and second users. The chain of trust relationships is established by determining if, for example, the first user is in an instant messaging buddy list of the second user, or if there is an intermediate user who both trusts the first user and is trusted by the second user. If a chain of trust relationships between the first and second users exists and is not too attenuated, the second user provides the first user with network access.

17 Claims, 5 Drawing Sheets

SELF-ORGANIZED NETWORK SETUP

BACKGROUND

The idea that entire communities should be provided with wireless network access, particularly through 802.11 channels, has lately been gaining support. In the first place, it would be a matter of convenience for individuals to have available wireless access to the Internet or to other networks (such as a voice communication network) with few geographic restrictions. In the second place, the availability of many, distributed wireless access points has been discussed as one possible solution for the crippling load on centralized communication services that often occurs in the case of disasters such as floods, hurricanes, or earthquakes. Because more and more individuals and businesses operate their own household or office wireless access points, it is becoming technically feasible to stitch together community-wide access from a patchwork of independent access points.

As desirable as it may appear to open access to all those within range, there are difficulties in ensuring the security and practicality of such a scheme. For example, an malicious user entering within range of a wireless access point could use up available bandwidth, slowing access for the remaining users, or worse, he could attempt to gain access to private data in individuals' home networks. While security software can make malicious use of a wireless access point more difficult, the first and most effective layer of protection is to prohibit untrusted users from using the access point in the first place. Many 802.11 "WiFi" connections require use of a 64-bit or 128-bit key to gain access. Distributing and typing in those keys is inconvenient, however, particularly for transient users such as houseguests or visiting business associates. Moreover, distributing a key to an individual also makes it possible for that individual to distribute the key to others, who in turn could continue distribution of the key until it reaches a malicious user.

There is a need to strike a balance between providing wireless access only to a few, trusted users and providing open access to everyone. At the same time, it is desirable to provide such advantages without requiring a new, separate authentication server.

SUMMARY

The techniques described herein provide for a system of network access that is self-organized along the lines of trust groups, such as instant messaging buddy lists. One user may provide a wireless network access point (such as a WiFi connection over a wireless router, for example). This user optionally broadcasts his instant messaging address in an overhead message. Another user requests access to the wireless network access point and identifies himself with information such as his own instant messaging address. The user providing the access point determines whether a trust relationship exists between himself and the user requesting access. If so, he permits use of his wireless network access point. To determine whether a trust relationship exists, the user providing access may check whether the user requesting access is in his instant messaging buddy list, and he may investigate further to determine whether a chain of trust relationships exists between the himself and the user requesting access.

DETAILED DESCRIPTION

In one exemplary embodiment, when a user requests access to the a wireless access point, one or more instant messaging buddy lists are consulted to determine whether the requesting user has a level of trust necessary to gain access.

Figure 1:
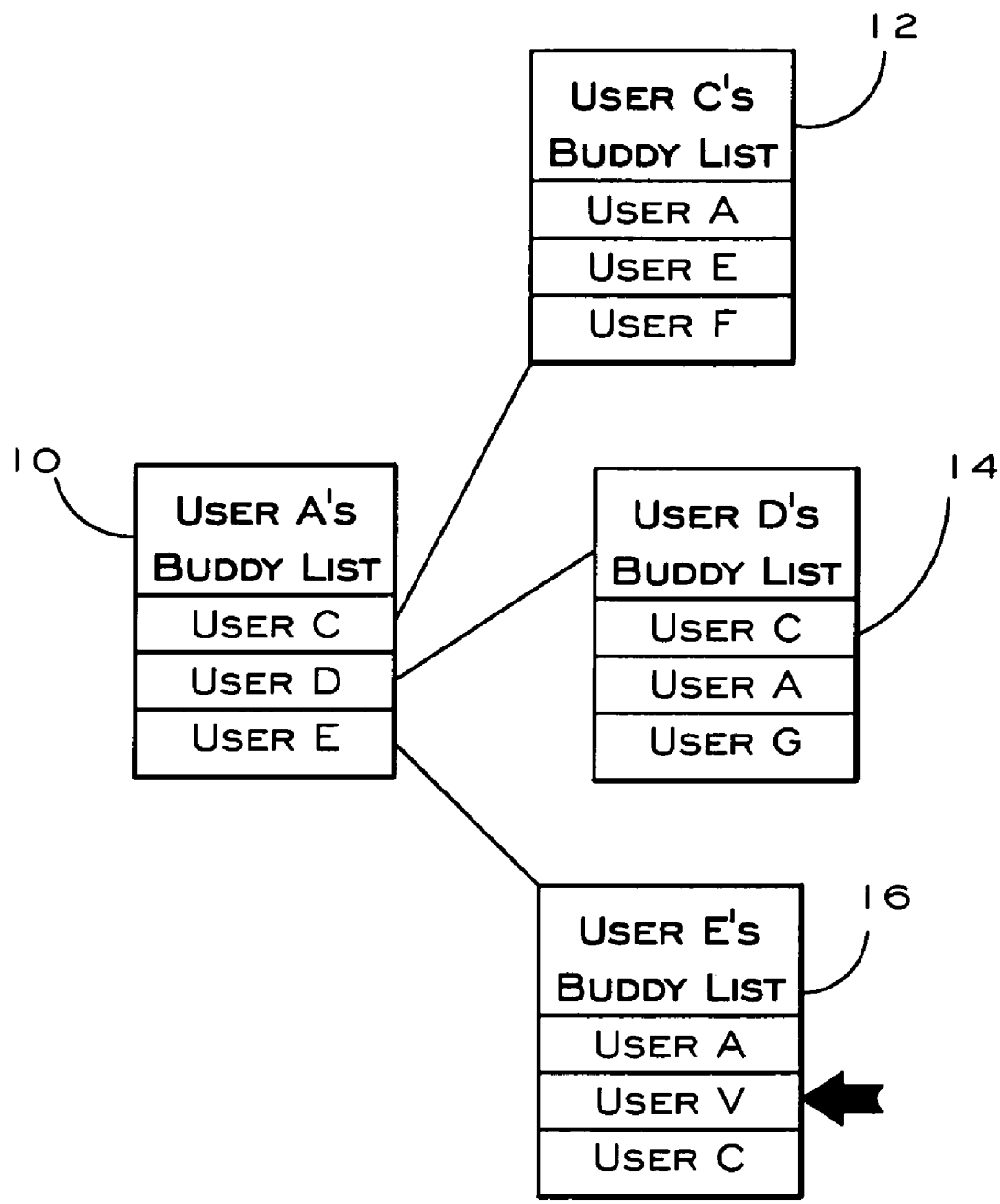
FIG. 1 schematically illustrates a logical relationship between buddy lists.

FIG. 1 illustrates logical relationships between users' buddy lists. User V is a user requesting access to a wireless access point. User V may or may not have a buddy list. Another user, User A, operates a wireless access point. User A's wireless access point may be implemented by, for example, a wireless WiFi router in User A's home or office.

User A has an instant messaging buddy list 10, which includes entries for User C, User D, and User E. When User V requests access to User A's wireless access point, User A first checks whether User V is identified in User A's own buddy list. As seen in FIG. 1, User V is not in User A's buddy list. Instead of denying User V access at that point, User A then determines whether User V is in the buddy list of any user in User A's buddy list. This may be described as User A determining whether User V is a "friend of a friend." User A does this by checking the buddy lists of User C, User D, and User E. User C's buddy list 12 does not include User V. Nor does User D's buddy list 14. User E's buddy list 16, however, does include a reference to User V (indicated with a broad arrow in FIG. 1).

After User A determines that a member of his own buddy list—User E—has identified User V in his buddy list, User A provides wireless access to User V. In different embodiments, User A may investigate to different levels of depth. For example User A may be willing to grant User V access if User V is a "buddy," a "buddy-of-a-buddy," or a "buddy-of-a-buddy-of-a-buddy," and so on, to whatever depth User A wishes to investigate. Investigating to too great of a depth is not likely to be helpful, since it would require a great expenditure of computing resources, and the results would not be particularly probative of a level of trust. (At the hypothesized "six degrees of separation," nearly all users would be presumed to trust one another. Though the hypothesis is more legendary than factual, is likely that allowing six users in a chain of trust would be excessively inclusive.)

A buddy list used in accordance with the present specification may be, for example, an AOL Instant Messenger buddy list, a Yahoo! Messenger buddy list, an MSN Messenger contact list, an ICQ contact list, or other buddy lists or contact lists.

A user's buddy list establishes a trust group, by identifying other users who are likely to be trusted by the user who maintains the buddy list. Other types of trust groups may alternatively be used in accordance with the principles described in the present specification. For example, employees of a common organization, or within a unit of an organization, may be arranged in a trust group. Neighbors may be arranged in trust groups, so that individuals are considered to trust users who live nearby. Various criteria may be used to determine which users are neighbors. For example, such criteria as distance (residing within ¼ mile, for example), on the same street, in the same apartment or condominium complex, etc.) Trust groups may also be set up among friends, club members, classmates, or other types of groups.

A combination of different types of trust groups may be used in the same implementation. As an example, User A may give User V access after determining that one of User A's neighbors has included User V in his buddy list. Or, similarly, User A may give User V access after determining that User V is a neighbor of a member of User A's buddy list.

In some embodiments, the user operating the wireless access point simply determines whether or not to provide access to the requesting user. In other embodiments, the user operating the wireless access point may determine a particular level of access for the requesting user, depending on a level of trust accorded that user. For example, if User A provides a wireless access point, and User V is in User A's buddy list, then User A may provide unlimited access to User V. However, if User V is merely a buddy-of-a-buddy, then User A may provide User V with access subject to certain limits. For example, User V may be permitted access only for a limited amount of time, may be permitted to download only a limited amount of data, or may be provided with limited bandwidth. Each of these limitations may be measured cumulatively, or on a periodic (daily, for example) basis. Similarly, communications with User V may be given a lower priority than communications with more-trusted users.

Figure 2:
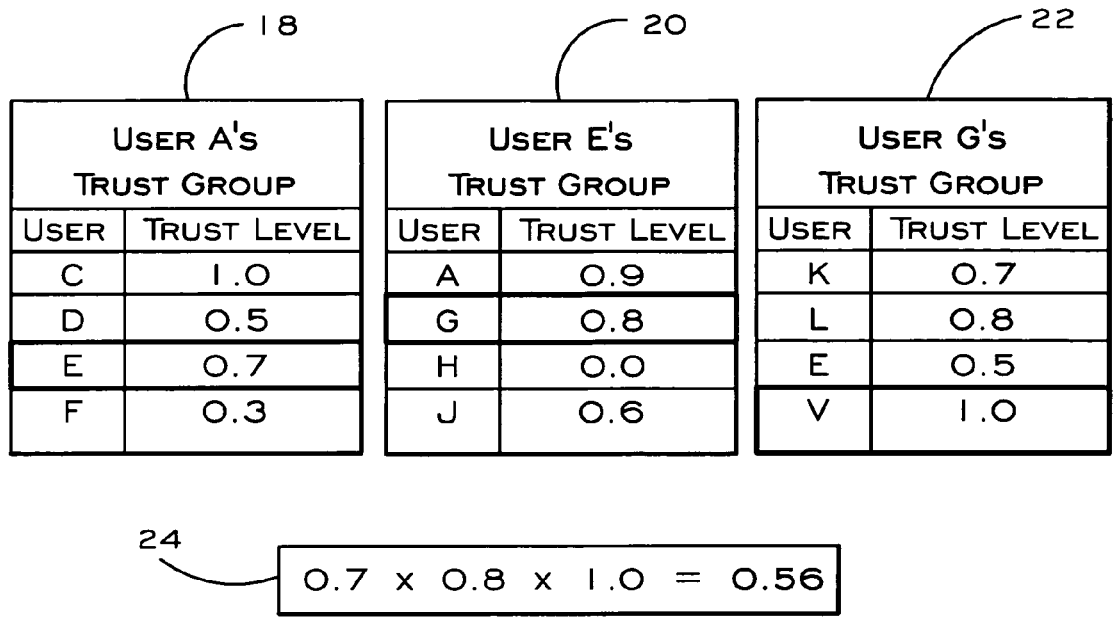
FIG. 2 schematically illustrates a logical relationship between trust groups.

The level of trust accorded a requesting user may be measured simply by counting the number of users in a chain of trusted users between the user operating the access point and the user requesting access. As an alternative, the measure of trust accorded the requesting user is determined in some other way through a chain of trust relationships between the requesting user and the user operating the access point. FIG. 2 illustrates the logical relationship between trust groups, in an embodiment in which the level of trust is determined with reference to a chain of trust relationships. As in FIG. 1, User V is a user requesting access to a wireless access point, while User A is a user associated with the wireless access point. The trust group 18 of User A (which may or may not be a buddy list) identifies users (C, D, E, and F, in this example), together with associated trust levels. These levels may be set voluntarily by a user himself, or they may be determined from other information.

Because User V is not a member of User A's trust group, User A attempts to form a chain of trust relationships between User V and User A. In the example of FIG. 2, User A is able to form a chain of trust relationships leading between User V and User A. This chain is made up of User A, User E, User G, and User V, in that order. User E is a user identified in User A's trust group 18. User G in turn is a user identified in User E's trust group 20. User V is identified in User G's trust group 22. Because User A trusts User E, User E trusts User G, and User G trusts User V, User A accords some level of trust to User V.

The level of trust that User A accords to User V may be determined by the level of trust accorded by each of the intermediate users E and G. For example, as shown in FIG. 2, the level of trust accorded by User A to User E is "0.7". (The trust levels used herein need not be decimal numbers, or even numbers at all, but the use of them in this example simplifies the description.) The level of trust accorded by User E to User G is "0.8," and the level of trust accorded by User G to User V is "1.0". User A may determine the level of trust it accords to User V using the trust levels of the various users in the chain. In one example of such a technique, User V simply multiplies the trust levels at each link in the chain. This calculation is illustrated at box 24 of FIG. 2, and results in this example in a trust level of "0.56" accorded by User A to User V. User A may then determine whether or not this trust level is sufficient to provide User V with access to User A's wireless access point.

User A may determine trust relationships of other users by querying a server, such as an instant messaging server, or it may query those users directly.

In one implementation, User A identifies a chain of trust relationships through an iterative process starting with its own trust group, then querying the trust groups of those in User A's trust group, then querying the trust groups of the resulting users, and so on. In another implementation, User V may provide "references" to User A by identifying to User A those who User V contends trust User V. As an example, User V may identify User G, User E, and/or others to User A. User A may then confirm the trust relationships without reference to trust groups that, in the end, prove unnecessary. User V may provide this information to User A either of its own accord, or in response to a query from User A.

In some implementations, the constitution of different users' trust groups may be kept in relative confidence. In such an embodiment, the contents of entire trust groups are not sent in there entirety. Rather, queries are generated and responded to that indicate whether a particular user is in a trust group. Using the logical relationships of FIG. 2, for example, User V is requesting access to User A's access point. User A queries each of the users C, D, E and F (in User A's trust group) to ask whether User V is in any of their respective trust groups. Depending on the implementation (or depending on the nature of the query from User A), the queried users may simply inform User A that User V is not (or is) in their respective trust groups. Alternatively, each of the queried users may query those in their own trust lists. The number of iterations through which the query propagates (before a negative result is returned) may be pre-set, or it may be determined by, for example, a header in the initial query. The value in the header may be decremented with each iteration. Thus, User E receives the query from User A, and instead of providing a negative response (because User V is not in User E's trust group), User E in turn queries Users G, H, and J. User G responds that User V is in User G's trust group. In this way User A can determine a level of trust to be accorded to User V, without requiring other trusted users to reveal the complete contents of their trust groups.

Figure 3:
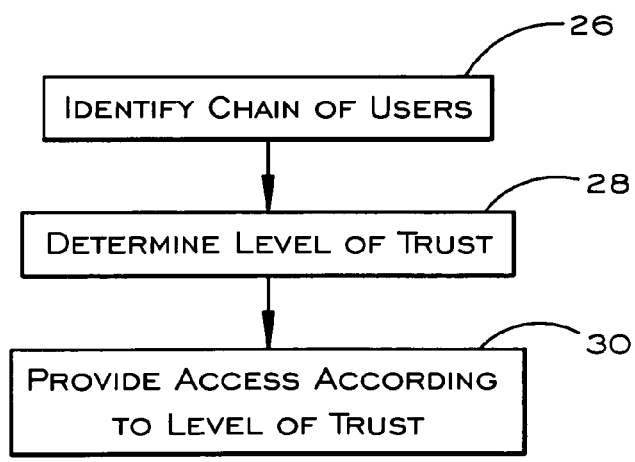
FIG. 3 is a flow diagram of a method of providing access in a self-organizing network.

An overview of a method of providing access is illustrated in FIG. 3. Such a method may be used when one user requests access to a wireless access point, such a WiFi connection, where the wireless access point is operated by a second user. In step 26, a chain of users is identified between the user requesting access and a user who operates the access point. In step 28, a level of trust is determined from the identified chain of users, and in step 30, the requesting user is provided access according to the level of trust. If more than one distinct chain of users can be identified between the requesting user and the user who operates the access point, the method may include determining the level of trust for the different chains of users and selecting the highest level of trust from among them. Alternatively, the method may include determining a level of trust from all identified chains of users. For example, a level of trust can be higher when more unique chains of users are identified (e.g., a user who is a friend of two friends can be trusted more than a friend of one friend).

Figure 4:
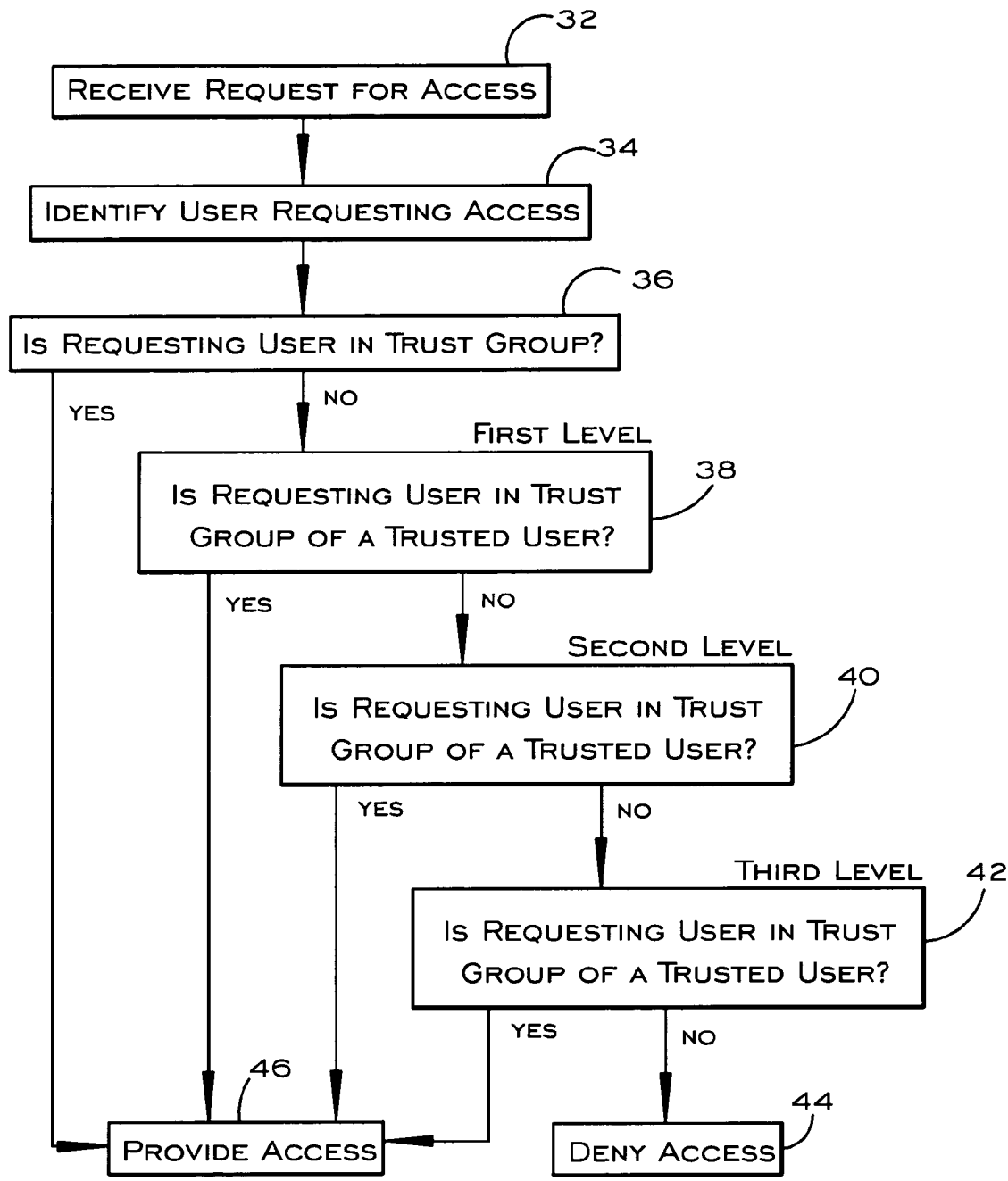
FIG. 4 is a flow diagram of a method of providing access in a self-organizing network.

A method is illustrated in greater detail in FIG. 4. In step 32, a user requests access. In step 34, the user requesting access is identified. Identifying the requesting user may involve determining an instant messaging address of the user, possibly from information sent by the user in the process of requesting access. In step 36, it is determined whether the requesting user is a member of a trust group of the user operating the access point. If so, the requesting user is provided access (step 46). If not, it is determined whether the requesting user is in the trust group of any trusted user. To do so, in a first level of investigation, it is determined in step 36 whether the requesting user is in the trust group of any user trusted by the user operating the access point. If so the requesting user is provided access (step 46). If not, an investigation into whether the requesting user is trusted continues to any degree desired. For example, while step 36 determines whether the requesting user is a "friend," and step 38 determines whether he is a "friend of a friend," step 40 determines whether he is a "friend of a friend of a friend" and step 42 determines whether he is a "friend of a friend of a friend of a friend." The maximum level to which the requesting user will be investigated may be pre-set, or the system may "time out" after a certain period if no trust relationship is established, or other means may be used to limit the resources dedicated to investigating the trustworthiness of the requesting user. If no trust relationship is identified, or if only an excessively attenuated trust relationship is identified, then the requesting user is denied access in step 44.

The step of providing access may include the use of conventional handshake, setup, authentication, and security techniques, such as wired equivalent privacy (WEP), WiFi protected access (WPA), 802.11i (also known as WEP2), or others.

Figure 5:
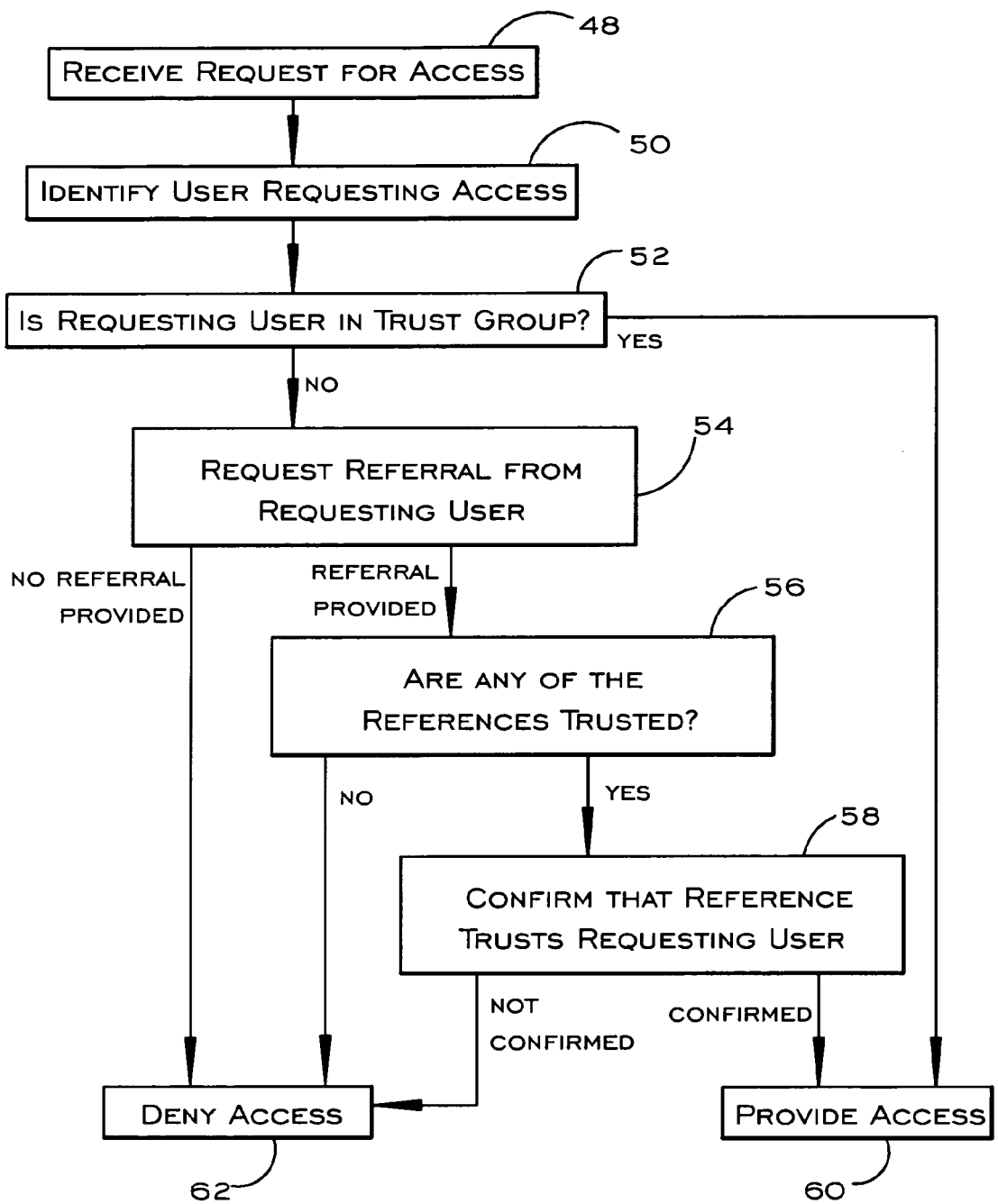
FIG. 5 is a flow diagram of a method of providing access in a self-organizing network.

Another method is illustrated in FIG. 5. In the method of FIG. 5, the user requesting access provides references, so that the user operating the access point can perform a more narrow investigation into trust relationships. In step 48, the user requesting access receives the request for access. The user requesting access is identified in step 50. In step 52 it is determined whether the user requesting access is a member of a trust group of the user operating the access point. If so, the requesting user is provided access in step 60. Otherwise, the requesting user is asked in step 54 to provide a referral in order to identify other users who (the requesting user contends) trust the requesting user. If no referrals are provided, access may be denied (step 62), or other efforts may be undertaken to identify a chain of trusted users (as in FIG. 4). If a referral is received, it is determined in step 56 whether any of the identified references are trusted by the user operating the access point. (The determination of whether a reference is trusted may be based solely on the trust group of the user providing access, or through a multi-level investigation as described in FIG. 4.)

If none of the references are trusted, then the requesting user may be denied access (step 62), or other efforts may be undertaken to identify a chain of trusted users (as in FIG. 4). Otherwise, if the requesting user has provided a trusted reference, the user operating the access point confirms in step 58 whether the reference actually trusts the requesting user. This may be done in one or more of a variety of ways. For example, the requesting user may be asked to provide a certificate issued by the reference. The certificate may be, for example, digitally signed by the reference's private key. The user operating the access point can decrypt the certificate with the reference's public key to verify the authenticity of the reference. In another technique of confirming the validity of the reference, the user providing the access point may contact the reference directly to query whether the reference trusts the requesting user. (The reference may be contacted directly in any event to determine the reference's public key and/or to check the references certificate revocation list.)

If confirmation is not possible, or if the reference does not actually trust the requesting user, then the requesting user may be denied access in step 62. Otherwise, the requesting user may be provided access in step 60.

Figure 6:
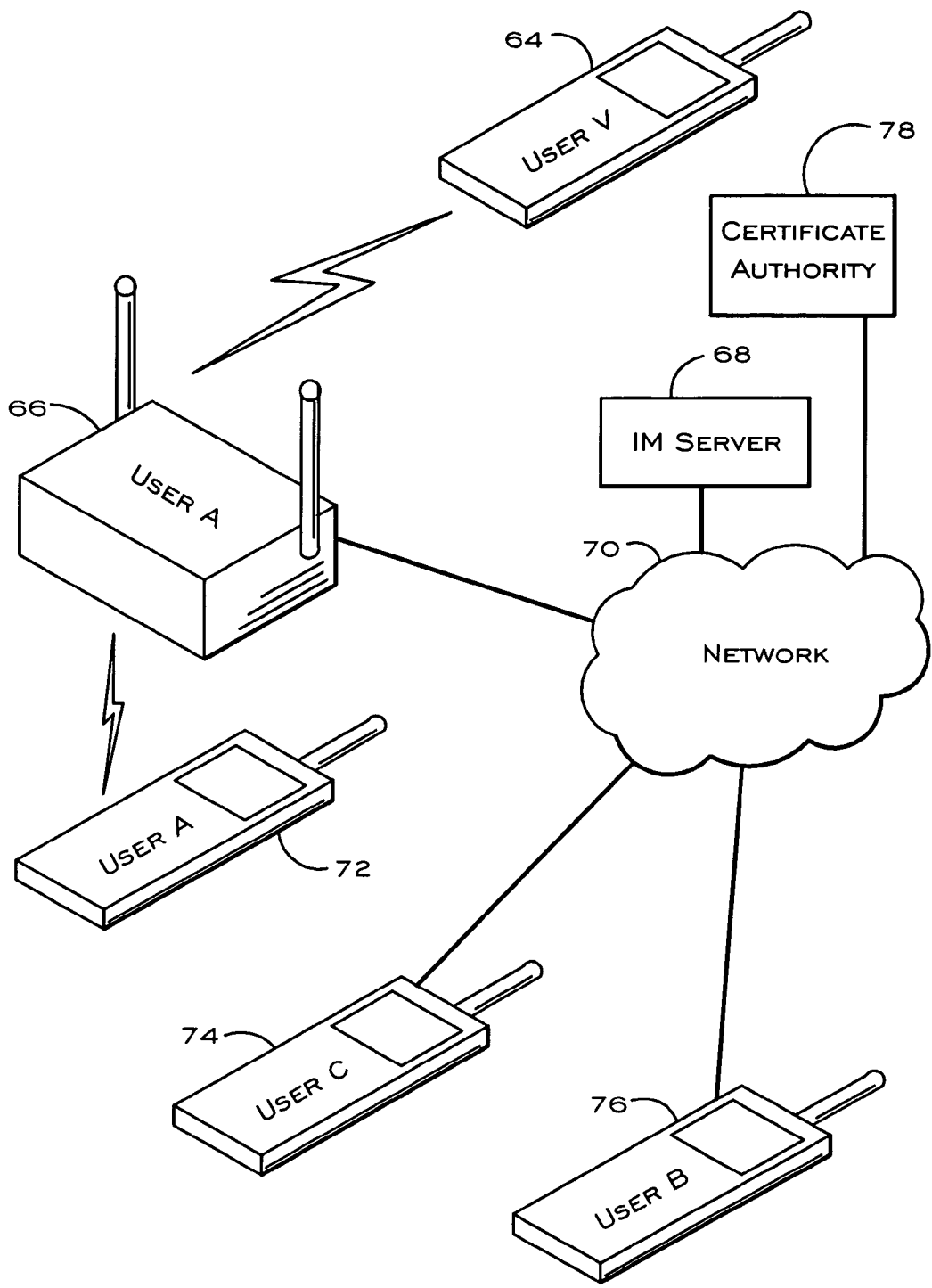
FIG. 6 is a schematic illustration of the logical architecture of a self-organizing network.

One example of a system that makes uses of the methods described herein is illustrated in FIG. 6. The users of the system are illustrated in FIG. 6 as using mobile telephones 64, 72, 74, and 76. In other embodiments, however, one or more (or all) of the users could be using different devices for network access, such as a wireless-enabled laptop computer. As in previous examples, User V (associated with device 64) is the user requesting access, while User A (associated with devices 66 and 72) is the user operating a wireless network access point. In the example of FIG. 6, User A operates a wireless router 66, which may itself be physically connected to a personal computer or other hardware (not shown). User A may also operate a mobile device 72, such as a mobile telephone or wireless-enabled personal computer. Users B and C may be in communication with User A over a telecommunications network 70, or they may communicate with User A by other means, such as a Bluetooth connection, a local area network (LAN) or by other means.

User A may broadcast its instant messaging address in an overhead message from the wireless access point 66. If User V may determine, based on the broadcast instant messaging address, whether to attempt to connect through User A's wireless access point. For example, User V may "listen" for wirelessly-broadcast instant messaging addresses, and may request access only to access points associated with users that User V recognizes as a "buddy." When User V requests access to User A's wireless access point, User A determines whether User V is in a trust group, such as a buddy list, of User A. The trust group of User A may be stored with User A's router and/or personal computer 66, with User A's mobile device 72, or at an instant messaging server 66. If User V is not in a trust group of User A, then User A investigates a chain of trust relationships between User A and User V. To do so, User A may contact other users (such as Users B and C) directly, or it may determine information about other user's trust groups through a server, such as an instant messaging server 66 and/or a certificate authority 78. User V may simplify this effort by sending to User A an appropriate list of references, which may be selected based on the instant messaging address broadcast by User A.

Those of ordinary skill in the art understand that individual persons are rarely aware of or directly responsible for the details involved in electronic communications, and that actions referred to as being performed by a user are often handled directly by hardware and/or software components that are controlled, at a high level, by the user and/or are operating on the user's behalf, whether or not they are physically in the user's possession.

Although the invention has been described by reference to the exemplary embodiments described above, it is not limited to those embodiments but rather is defined by the following claims.

The invention claimed is:

1. A method comprising:
   a wireless access point of a first user receiving from a wireless device of a second user a request for access to the wireless access point of the first user;
   responsive to the request, the wireless access point of the first user determining whether the second user is in a trust group of the first user;
   if the second user is not in a trust group of the first user, then the wireless access point of the first user determining whether there exists a third user such that the second user is in a trust group of the third user and the third user is in the trust group of the first user; and only if the second user is in a trust group of the first user or is in a trust group of the third user, the wireless access point of the first user providing the second user with access to the wireless access point of the first user in response to the request, wherein at least one of the trust groups is a buddy list.

2. The method of claim 1, wherein the trust group of the third user is a buddy list, and wherein determining whether the second user is in a trust group of the third user includes querying an instant messaging server to determine whether the second user is a member of the buddy list of the third user.

3. The method of claim 1, wherein the trust group of the first user is a buddy list, and wherein determining whether the second user is in a trust group of the first user includes querying an instant messaging server to determine whether the second user is a member of the buddy list of the first user.

4. The method of claim 1, further comprising the wireless access point of the first user broadcasting an instant messaging address of the first user.

5. The method of claim 1, further comprising the wireless access point of the first user receiving a reference from the second user, wherein the reference identifies the third user.

6. The method of claim 5, further comprising the wireless access point of the first user determining whether the user identified by the reference is in a trust group of the first user.

7. The method of claim 5, further comprising the wireless access point of the first user checking the reference to determine whether the second user is in a trust group of the user identified in the reference.

8. The method of claim 7, wherein checking the reference includes verifying a digital certificate.

9. A method comprising:

a wireless access point of a first user receiving from a wireless device of a second user a request for access to the wireless access point of the first user;

in response to receiving the request for access, the wireless access point of the first user identifying a chain of trust relationships from the second user to the first user via at least a third user;

based at least in part on the chain of trust relationships, the wireless access point of the first user assigning to the second user a level of service; and in response to receiving the request for access, the wireless access point of the first user providing the second user with access to the wireless access point of the first user in accordance with the assigned level of service, wherein each trust relationship of the chain of trust relationships comprises being on a buddy list.

10. The method of claim 9, wherein the assigned level of service includes a limitation on amount of access time.

11. The method of claim 9, wherein the assigned level of service includes a limitation on bandwidth.

12. The method of claim 9, wherein the assigned level of service includes a limitation on communication priority.

13. The method of claim 9, further comprising the wireless access point of the first user receiving a reference from the second user, wherein the reference identifies a user having a trust relationship with the second user.

14. The method of claim 13, further comprising the wireless access point of the first user determining whether the first user trusts the user identified by the reference.

15. The method of claim 13, further comprising the wireless access point of the first user checking the reference to determine whether the identified user trusts the second user.

16. The method of claim 9, further comprising the wireless access point of the first user broadcasting an instant messaging address of the first user.

17. A method comprising:

a wireless access point of a first user determining whether a second user seeking access to a wireless access point of a first user is a member of an instant messaging buddy list of the first user; and the wireless access point of the first user providing the second user access to the wireless access point of the first user only after determining that the second user is a member of the instant messaging buddy list of the first user.

\* \* \* \* \*